United States Patent [19]

Edwards et al.

[11] 4,256,349
[45] Mar. 17, 1981

[54] ROAD WHEELS

[75] Inventors: Michael F. Edwards; Edward Williams, both of Wolverhampton, England

[73] Assignee: GKN Sankey Limited, Telford, England

[21] Appl. No.: 8,128

[22] Filed: Jan. 31, 1979

[30] Foreign Application Priority Data

Feb. 1, 1978 [GB] United Kingdom ................. 4019/78
May 23, 1978 [GB] United Kingdom ............... 21676/78

[51] Int. Cl.$^3$ ............................................ B60B 11/06
[52] U.S. Cl. .................................. 301/13 SM; 301/20
[58] Field of Search ................. 301/10 R, 11 R, 11 S, 301/13 R, 13 SM, 18–21, 24, 36 R, 36 WP, 38 R, 29 R, 405, 95–98; 295/8.5; 29/159.1, 159.01, 159 R

[56] References Cited

U.S. PATENT DOCUMENTS

| 2,884,280 | 4/1959 | Atkin | 301/13 SM |
| 2,929,659 | 3/1960 | Walther | 301/13 SM |
| 3,144,275 | 8/1964 | Walther | 301/13 SM |
| 4,162,105 | 7/1979 | Walther | 301/13 SM |

FOREIGN PATENT DOCUMENTS 3651  8/1979  European Pat. Off. ............ 301/13 SM

*Primary Examiner*—H. Grant Skaggs
*Attorney, Agent, or Firm*—Merriam, Marshall & Bicknell

[57] ABSTRACT

A demountable wheel rim assembly for a road vehicle and comprising a rim and an adapter band extending outwardly well beyond the rim so that two assemblies can be placed on a hub for a dual-type wheel with the bands abutting to space the rims without a separate spacer band. The band may have notches or openings in its free end portion to receive clamps for use when it is mounted singly on a hub.

5 Claims, 7 Drawing Figures

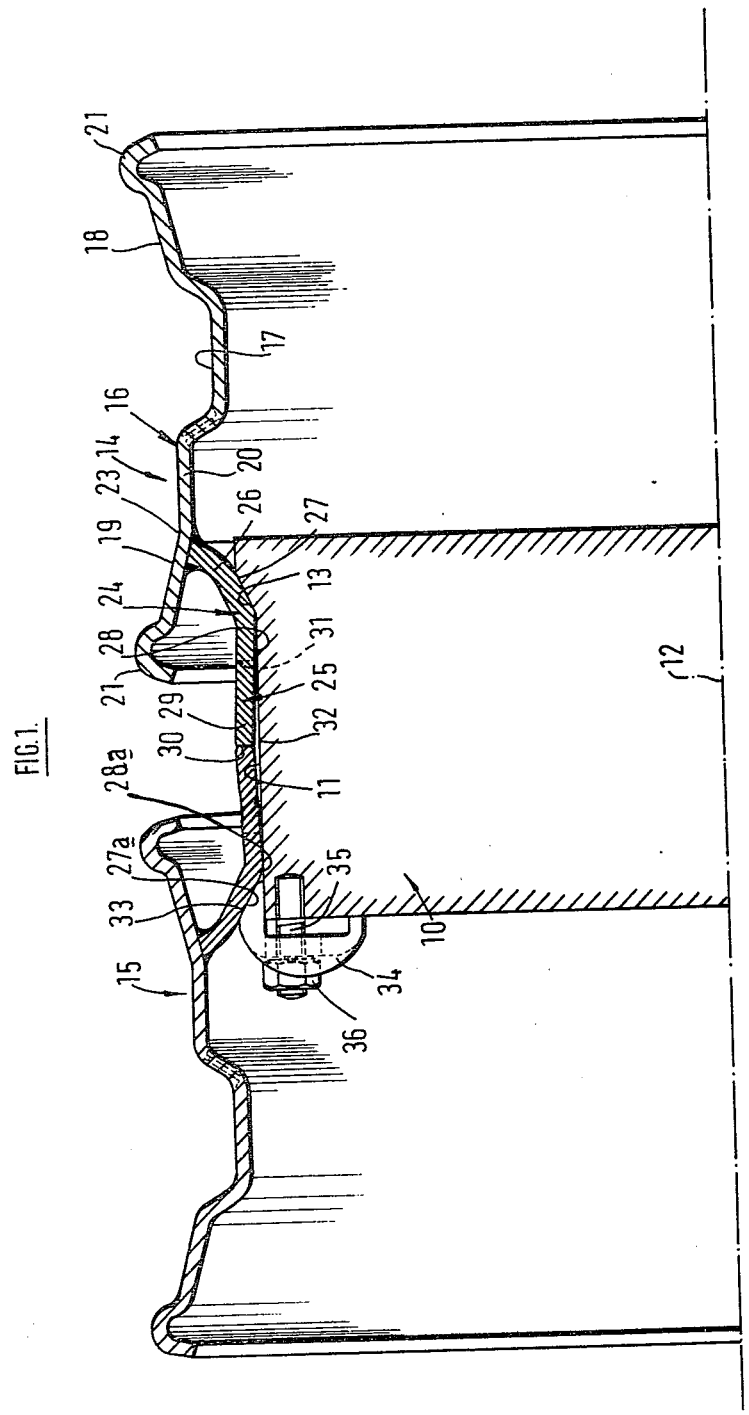

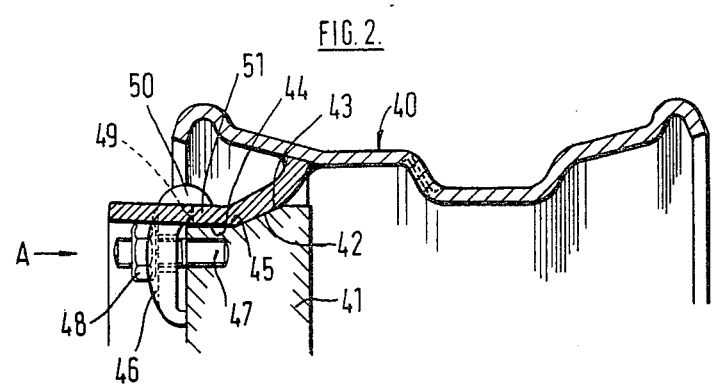
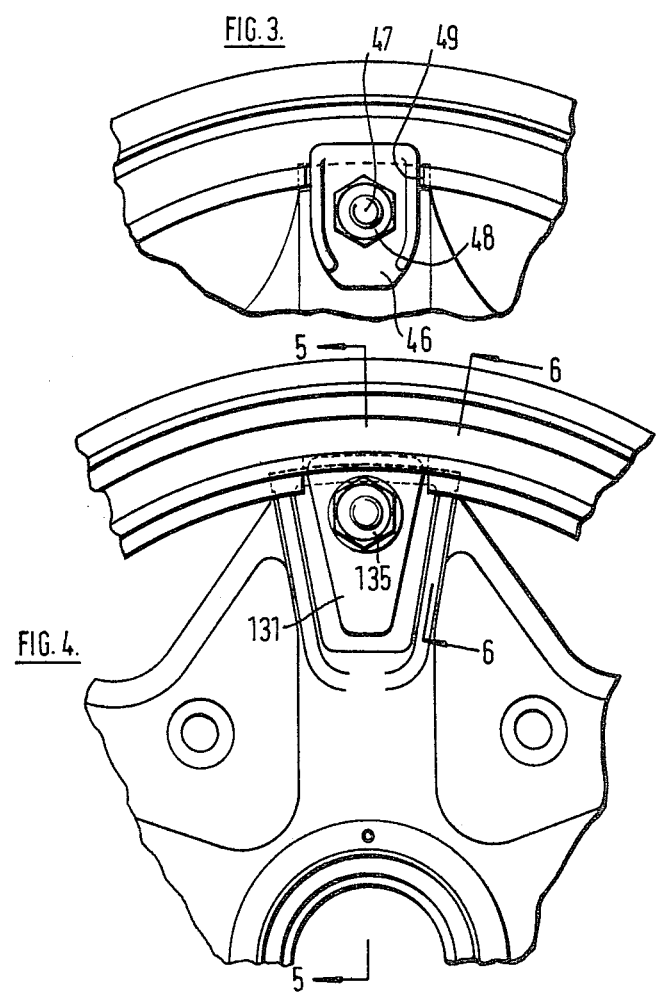

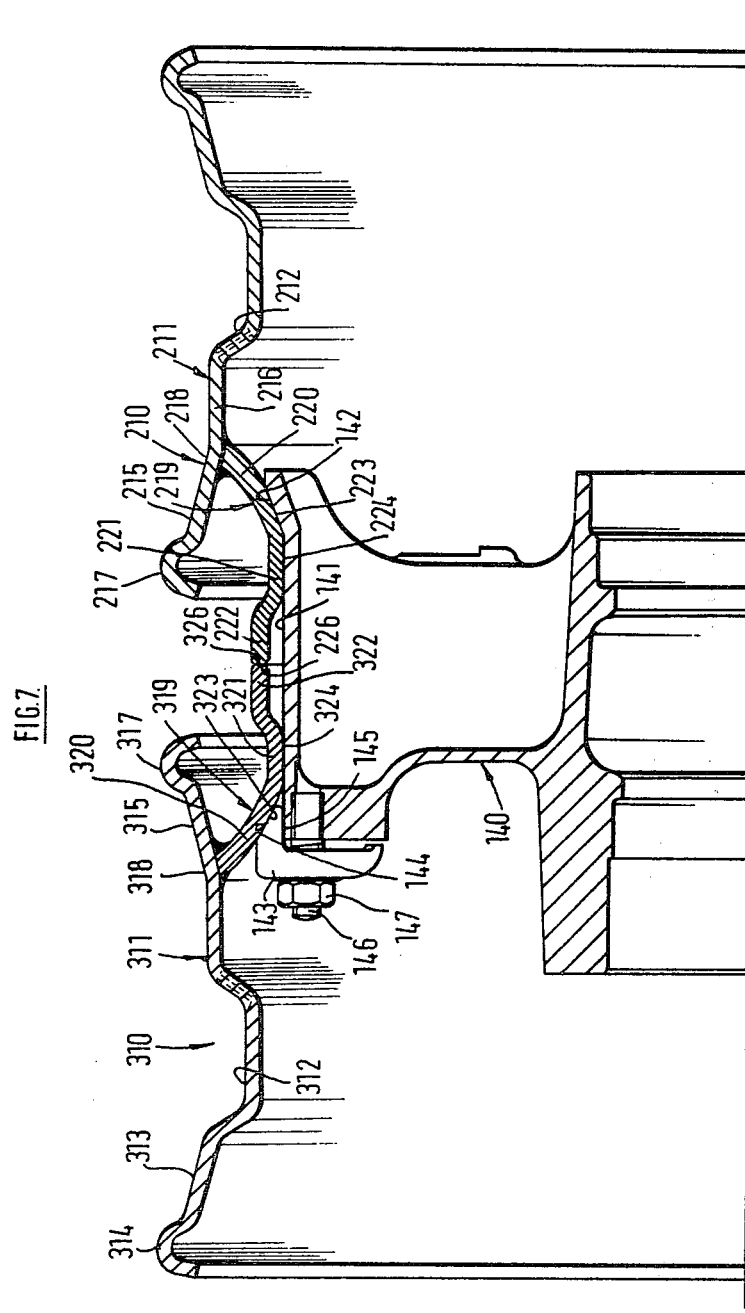

ROAD WHEELS

BACKGROUND OF THE INVENTION

1. Field of the Invention

This invention relates to road wheels for vehicles and more specifically to a demountable rim assembly comprising a rim to receive a tyre and an adapter band welded to the rim, the adapter band being capable of being releasably secured to a hub.

Such demountable rim assemblies are often mounted in pairs on a hub with a spacer between them as rear wheels on a vehicle or a trailer while for front wheels the rim assemblies are mounted singly on a hub. One of the problems encountered in the use of such assemblies is the lack of radial and lateral truth thereof which causes vibration and brake judder. Another problem, particularly when the assemblies are used on front wheels subject to heavy braking loads, is the need to deform the adapter band to chord it when the rim assembly is being mounted onto the hub so as to prevent relative rotational movement between the hub and adapter band during such heavy braking.

It is an object of the invention to provide demountable rim assemblies which can be used either singly or in pairs and which will perform better than those at present in use. It is also an object of the invention to provide a wheel including one or two such demountable rim assemblies.

2. SUMMARY OF THE INVENTION

According to one aspect of the invention we provide a demountable rim assembly comprising a rim and an adapter band welded to the rim, the band having an annular portion which projects from the rim centre well beyond the rim and which has internal cylindrical and divergent machined surfaces which are true about the rotary axis of the assembly having been machined after welding of the band to the rim, the free end portion of the band also having a machined free end surface which lies in a plane perpendicular to said rotary axis.

When the assembly is mounted on a hub, the cylindrical and divergent surfaces engage with complementary cylindrical and divergent surfaces on the hub. The complementary divergent surfaces are forced into frictional engagement by clamps which clamp the assembly to the hub and the cylindrical surfaces are telescoped and centre the assembly on the hub. By machining these surfaces, so that the adapter band is a close fit on the hub, radial and lateral truth of the rim is ensured and vibration and brake judder can be reduced or eliminated. By way of example, for a nominal 22.5" diameter wheel the hub may have a diameter of 18.542"±0.004" and the cylindrical surface in the band a diameter of 18.558"±0.004" giving minimum and maximum clearances between hub and band of 0.008 and 0.024" respectively.

When demountable rim assemblies embodying the invention are used in pairs, the free end surfaces of the adapter bands of the two assemblies abut to space the rims apart so that a separate spacer is not required.

According to another aspect of the invention, we provide a wheel assembly comprising a hub having an external cylindrical surface and an external divergent surface, two demountable rim assemblies mounted on the hub, each rim assembly comprising a rim and an adapter band welded to the rim, the band having an annular portion which projects from the rim centre well beyond the rim, the annular portions of the two bands being mounted about the cylindrical surface of the hub so that internal cylindrical machined surfaces on the bands engage said cylindrical surface on the hub and so that machined surfaces on free ends of the bands and lying in a plane perpendicular to the rotary axis of the wheel assembly abut, each band having an internal, machined divergent surface, the divergent surface on one of said bands engaging the divergent surface of the hub and the divergent surface on the other of said bands being engaged by clamping means so as to force said divergent surface on the one band into engagement with the divergent surface on the hub.

Thus in a dual-tyred assembly the normally used spacer can be omitted since the free ends of the adapter bands will abut. The adapter bands therefore have to be of sufficient length to space the tyres of the dual-tyred assembly.

In one embodiment of the invention the free end portion of each adapter band may be provided with notches and the demountable rim assembly may be mounted singly on a hub by clamping means which engage said free end portion and which are located in the notches to prevent relative rotation between the hub and the demountable rim assembly.

In another embodiment of the invention the adapter band has, outboardly of said divergent surface, a plurality of holes therein to receive clamping means, the free end portion of the band being continuous.

By "outboard" and "outboardly" we mean in directions away from the centre of the well of the rim.

The adapter band may have, immediately outboard of said divergent surface, a first cylindrical portion in which said internal cylindrical surface is machined and, outboardly of said first portion, a second cylindrical portion of larger diameter than said first portion, the holes intersecting both the first and second portions and the second portion providing the free end portion of the band.

By making the free end portion of the band continuous rather than slotted as in the first embodiment the adapter band is stiffer, stronger and safer.

BRIEF DESCRIPTION OF THE DRAWINGS

The invention will now be described in detail by way of example with reference to the accompanying drawings, in which:

FIG. 1 is an axial section through a part of a dual-tyred wheel containing two demountable rim assemblies constituting a first embodiment of the invention;

FIG. 2 is an axial section through a part of a wheel including a single demountable rim assembly constituting a first embodiment of the invention;

FIG. 3 is a view in the direction of the arrow A in FIG. 2,

FIG. 4 is a partial elevation of a rim and band assembly constituting a second embodiment of the invention;

FIG. 7 is a partial axial section through a dual-tyred wheel containing two demountable rim assemblies of the construction shown in FIG. 4.

DESCRIPTION OF THE PREFERRED EMBODIMENTS

Figure 5:
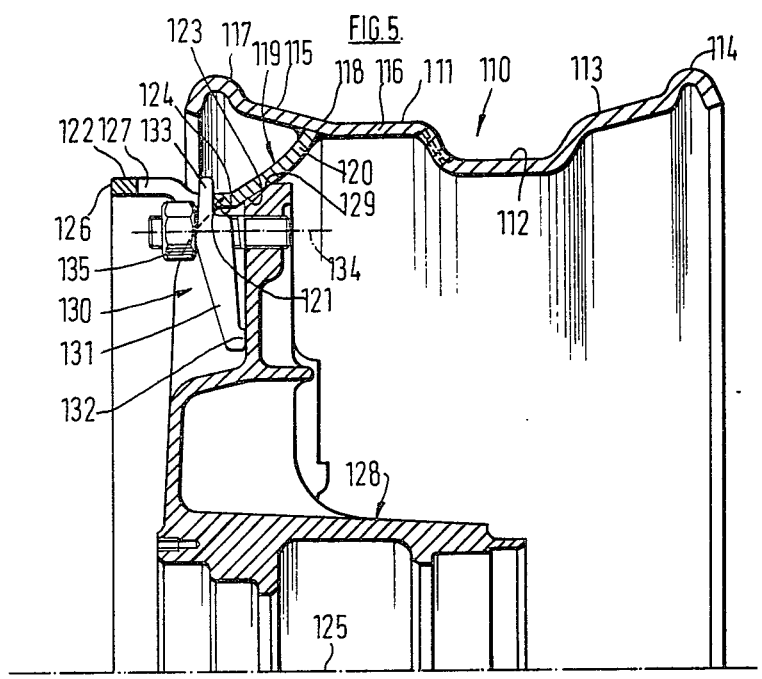
FIG. 5 is a section on the line 5—5 of FIG. 4.
Figure 6:
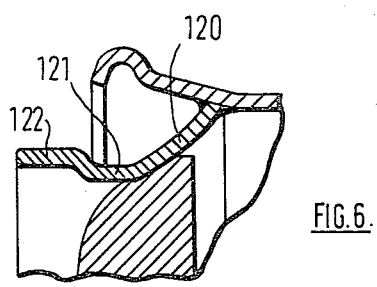
FIG. 6 is a section on the line 6—6 of FIG. 4.

Referring now to FIG. 1, a wheel hub is indicated at 10. The hub has an external cylindrical surface 11 which is machined so as to be true about the rotary axis 12 of the hub and a machined divergent surface 13 which is frusto-conical and is also true about the axis 12. Mounted on the hub are two demountable rim assemblies 14 and 15 respectively, these rim assemblies being identical. The rim assembly 14 will be described in detail and comprises a rim 16 which is of the asymmetric, drop-centre type having a well 17, a bead seat 18, a second bead seat 19 and a generally cylindrical ledge 20. Tyre retaining flanges 21 are located at the axially outer ends of the bead seats. The rim is formed from strip material of uniform thickness in a manner known per se. The transition between the ledge 20 and the bead seat 19 is indicated at 23 and an adapter band 24 is welded to the rim adjacent to the said transition. The adapter band is welded to the rim in the position described in Continuation in Part Application Ser. No. 962,345 filed Nov. 20, 1978 by Michael Frederick Edwards and John Dickson Mabon, assigned to GKN Sankey Limited, the assignee of the subject application.

The band 24 is also made from strip material of uniform thickness which is circled, welded and then deformed to the shape shown. The band has a cylindrical portion 25 and a divergent portion 26. Internally of the divergent portion 26 is a machined frusto-conical surface 27 which merges with a machined internal cylindrical surface 28 within the portion 25. These surfaces 27 and 28 are machined about the rotary axis 12 of the assembly after the adapter band has been welded to the rim so that the truth of the surfaces is not affected by ovality or shrinkage caused by welding.

It will be noted that the adapter band 25 has an annular portion 29 which projects to the left well clear of the tyre retaining flange 21. That is to say the portion 29 extends, from the centre of the rim, well clear of the rim. The free end 30 of the portion 29 is machined after the adapter band has been welded to the rim so as to provide a surface which lies in a plane perpendicular to the rotatry axis 12. The cylindrical portion 29 is provided with a number of notches 31 equi-angularly spaced about the axis 12 for a purpose which will be described below.

The demountable rim assemblies 14 and 15 are mounted on the hub 10 so that the machined divergent surface 27 of the assembly 14 engages the divergent surface 13 and the machined cylindrical surface 28 surrounds the machined cylindrical surface 11. It will be noted that there is a clearance 32 between the portion 29 and the surface 11. The assembly 15 is mounted on the hub so that the free end of its adapter band engages the free end of the adapter band 25. The adapter bands are so dimensioned that the rims of the rim assemblies are spaced apart by a distance sufficient to give clearance to the two tyres, not shown, mounted on the rims. The cylindrical machined surface 28a of the adapter band of the rim assembly 15 surrounds the machined surface 11 and the machined frusto-conical surface 27a of the adapter band of the assembly 15 is engaged by a frusto-conical surface 33 on a clamp 34 which is engaged on a stud 35 on the hub and is urged to the right by a nut 36. The clamp is one of a number of clamps equi-angularly spaced about the axis 12.

It will be seen that by tightening the nuts 36, the rim assembly 15 will be moved to the right in FIG. 1 and will force the free ends of the adapter bands into engagement and will thus force the surface 27 on the rim assembly 14 into engagement with the surface 13 so that the two rim assemblies will be clamped in position on the hub 10 and will be centred by virtue of the machined surfaces 28 and 28a.

Referring now to FIGS. 2 and 3, these show a demountable rim assembly 40 of identical construction to the rim assembly 14 mounted on a hub 41. As before, the adapter band has a machined frusto-conical surface 42 which engages a complementary surface 43 on the hub and a machined cylindrical surface 44 which surrounds a complementary surface 45 on the hub. The surfaces 42 and 43 are urged into engagement by clamps, one of which is shown at 46 mounted on a stud 47 on the hub 41, the clamp being engaged by a nut 48 which urges the clamp to the right. The clamp is mounted in one of the notches 49 in the adapter band. As shown in FIG. 3, there is only a small clearance between the sides of the clamp and the sides of the notch so that the clamps serve to prevent relative rotation between the rim assembly and the hub while at the same time urging the surfaces 42 and 43 into engagement. The clamp has a portion 50 which overlies the part 51 of the adapter band thus preventing radially outward movement of the adapter band.

The clamps thus locate the rim assembly on the hub and prevent relative rotation between the two parts and the truth of the assembly is assured by the machined surfaces 42 and 44 thereon.

When used on a front axle the adapter band will, as described, extend outwardly of the wheel in an axial direction to provide a stud guard and a step for entering the vehicle cab. A stud cover could be mounted on the ring.

Referring now to FIG. 5, the rim assembly is indicated at 110 and comprises a rim 111 which is of the asymmetric, drop-centre type having a well 112, a first bead seat 113, a tyre retaining flange 114, a second bead seat 115, a ledge 116 between the well 112 and the bead seat 115 and a second tyre bead retaining flange 117.

The rim is formed from strip material of uniform thickness in a manner known per se. The transition between the ledge 116 and the bead seat 115 is indicated at 118 and the adapter band, which is indicated at 119, is welded to the rim adjacent to the transition 118 as described above.

The adapter band is also made of strip material of uniform cross section which is circled, welded and deformed to the shape shown. The band has a divergent portion 120, a first cylindrical portion 121 of lesser diameter and a second cylindrical portion 122 of greater diameter. internally of the divergent portion 120 is machined a frusto-conical surface 123 and internally of the cylindrical surface 121 is machined a cylindrical surface 124. These surfaces 123 and 124 are machined about the rotary axis 125 of the assembly after the adapter band 119 has been welded to the rim 111 so that the truth of the surfaces is not affected by ovality or shrinkage due to welding. The surfaces 123 and 124 merge with one another.

It will be noted that the adapter band projects to the left in FIG. 5 well clear of the rim and provides a free end surface 126 which is also machined after the rim has been welded to the adapter band to provide a surface perpendicular to the rotary axis 125.

Formed in the adapter band is a plurality of apertures, one of which is shown at 127.

The assembly 110 is mounted on a hub 128 having a divergent surface 129 which is complementary to the surface 123. The assembly is clamped in position by a plurality of clamps, one of which is indicated at 130.

Each clamp comprises an arm 131 which engages at one end 132 with the hub and engages at the other end 133 with the surface of the right-hand end of the aperture 127. The arm is mounted on a wheel stud 134 which carries a nut 135. It will be appreciated that by tightening the nut the surfaces 123 and 129 will be brought into engagement and the rim assembly clamped on the hub. The aperture 127 gives clearance to the nut 135 and facilitates the fitting of the clamp 130. However, the free end portion of the adapter band is continuous and provides a continuous machined surface 126.

FIG. 7 shows two rim assemblies of the design shown in FIG. 4 mounted on a hub for a dual-tyred wheel as described in relation to FIG. 1.

The rim assemblies in FIG. 7 are indicated at 210 and 310 respectively and the parts thereof are indicated by the reference numerals used in FIG. 5 with the substitution of the prefix 2 or 3 as the case may be for the prefix 1 used in FIG. 4.

The hub carrying the rim assemblies is indicated at 140 and has an external cylindrical surface 141 and an external divergent surface 142. The rim assembly 210 has its internal divergent surface 223 in engagement with the divergent surface 142 and its internal cylindrical surface 224 in engagement with the surface 141. The assembly 310 has its cylindrical surface in engagement with the cylindrical surface 141 and the free ends 226 and 326 of the adapter bands 219 and 319 of the two assemblies are in engagement. The divergent surface 323 is engaged by a number of clamps one of which is shown at 143 which has an external divergent surface 144 and an internal cylindrical surface 145. The clamp is mounted on a wheel stud 146 and is urged to the right by a nut 147. The clamps urge the rim assemblies into mutual engagement and the rim assembly 210 into engagement with the surface 142 in a manner similar to that described in relation to FIG. 1 thus concentrically and firmly mounting the rim assemblies on the hub. A number of clamps such as 143 will be provided equiangularly spaced around the rotary axis of the wheel assembly.

In assemblies embodying the invention the rim may be welded to the adapter band in a different configuration from that shown in the drawings, thus the band may be welded under the ledge with a lap weld. In either configuration only one weld may be used instead of the two shown.

The rim and band are shown as being made of strip material but may, if desired, be made as rolled sections.

Different clamp designs may be employed from those shown in the drawings. The location of the clamps in the notches or openings in the band, when the assembly is mounted on a front axle, eliminate the need for drivers presently used to position the rim assembly relative to the hub. Drivers may still be required when rim assemblies embodying the invention are used on rear axles in pairs.

It will be seen that the invention provides an improved demountable rim assembly and a wheel including one or two such assemblies.

I claim:

1. A demountable rim assembly comprising a rim, an adaptor band having opposite circumferential edges, a weld between one of said edges and the rim, the band extending from said weld axially of the assembly well beyond the rim and to the other of said edges, the band having, adjacent to said weld, an internal divergent machined surface and adjacent to said other edge a cylindrical portion which projects axially beyond the rim and has an internal cylindrical machined surface, the cylindrical portion being apertured to receive clamping means, said surfaces being true about the rotary axis of the assembly having been machined after welding of the band to the rim, said other edge being constituted by a machined surface which lies in a plane perpendicular to said rotary axis.

2. A wheel assembly comprising a hub having an external cylindrical surface and an external divergent surface; two demountable rim assemblies mounted on the hub; each rim assembly comprising a rim and an adaptor band having opposite circumferential edges, a weld between one of said edges and the rim, the band extending from said weld axially of the assembly well beyond the rim to the other of said edges, the band having, adjacent to said weld, an internal divergent machined surface and adjacent to said other edge a cylindrical portion which projects axially beyond the rim and has an internal cylindrical machined surface, the cylindrical portion being apertured to receive clamping means, said surfaces being true about the rotary axis of the assembly having been machined after welding of the band to the rim, said other edge being constituted by a machined surface which lies in a plane perpendicular to said rotary axis; and wherein the internal divergent surface of one of said rims engages the external divergent surface on the hub, the cylindrical portions of the rim assemblies are mounted about the cylindrical surface of the hub so that said internal cylindrical machined surfaces on the bands engage said cylindrical surface on the hub and so that said other edges of the rim assembly are in engagement, the internal divergent surface on the other of said rim assemblies being engaged by clamping means so as to force the internal divergent surface on said one rim assembly into engagement with the external divergent surface on the hub.

3. A demountable rim assembly comprising a rim, an adaptor band having opposite circumferential edges, a weld between one of said edges and the rim, the band extending from said weld axially of the assembly well beyond the rim to the other of said edges, the band having, adjacent to said weld, an internal divergent machined surface, immediately outboard of said divergent surface a first cylindrical portion which has an internal cylindrical machined surface, and outboard of said first cylindrical portion a second cylindrical portion of larger diameter than said first portion, holes intersecting both first and second portions, the latter providing the other of said edges which is continuous and is constituted by a machined surface which lies in a plane perpendicular to the rotary axis of the assembly, said internal machined surfaces being true about said rotary axis having been machined after welding of the band to the rim.

4. A wheel assembly comprising a hub having an external cylindrical surface and an external divergent surface, a demountable rim assembly comprising a rim, an adaptor band having opposite circumferential edges, a weld between one of said edges and the rim, the band extending from said weld axially of the assembly well beyond the rim to the other of said edges, the band having adjacent said weld an internal divergent machined surface which engages said external divergent surface on the hub, the band having immediately outboard of said internal divergent surface a first cylindrical portion which has an internal cylindrical machined surface which engages the cylindrical surface on the hub and, outboard of said first cylindrical portion, a second cylindrical portion of larger diameter than said first portion, holes intersecting both the first and second portions, and clamping means received in said holes to force the internal and external divergent surfaces into engagement, said second portion providing said other edge of the band which is continuous and is constituted by a machined surface which lies in a plane perpendicular to the rotary axis of the assembly, said internal machined surfaces being true about said rotary axis having been machined after welding of the band to the rim.

5. A wheel assembly comprising a hub having an external cylindrical surface and an external divergent surface; two demountable rim assemblies mounted on the hub; each rim assembly comprising a rim and an adaptor band having opposite circumferential edges, a weld between one of said edges and the rim, the band extending from said weld axially of the assembly well beyond the rim to the other of said edges, the band having, adjacent to said weld, an internal divergent machined surface, immediately outboard of said divergent surface a first cylindrical portion which has an internal cylindrical machined surface, and outboard of said first cylindrical portion a second cylindrical portion of larger diameter than said first portion, holes intersecting both first and second portions, the latter providing the other of said edges which is continuous and is constituted by a machined surface which lies in a plane perpendicular to the rotary axis of the assembly, said internal machined surfaces being true about said rotary axis having been machined after welding of the band to the rim, and wherein the internal divergent surface of one of the said rims engages the external divergent surface on the hub, the cylindrical internal surfaces of the bands engage the cylindrical surface of the hub, said other edges of the bands are in engagement and the internal divergent surface on the other of said rim assemblies being engaged by clamping means so as to force the internal divergent surface on said one rim assembly into engagement with the external divergent surface on the hub.

* * * * *